Sept. 22, 1953      C. E. HASTINGS      2,652,723
THERMAL AIR-SPEED INDICATOR
Original Filed April 6, 1945
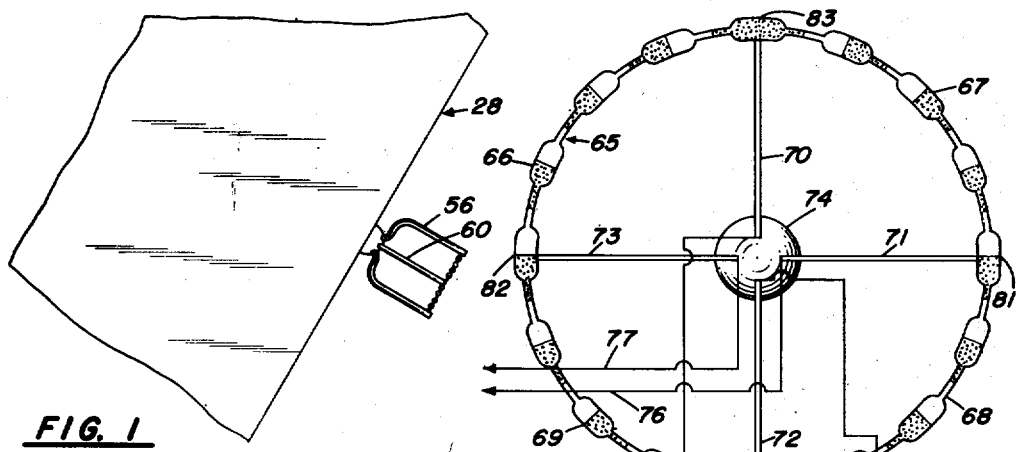
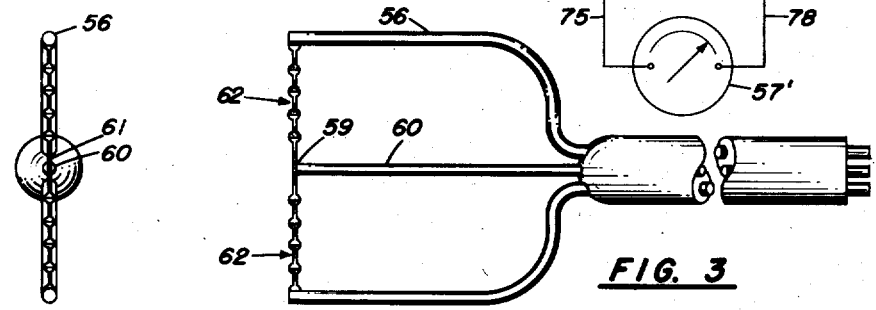
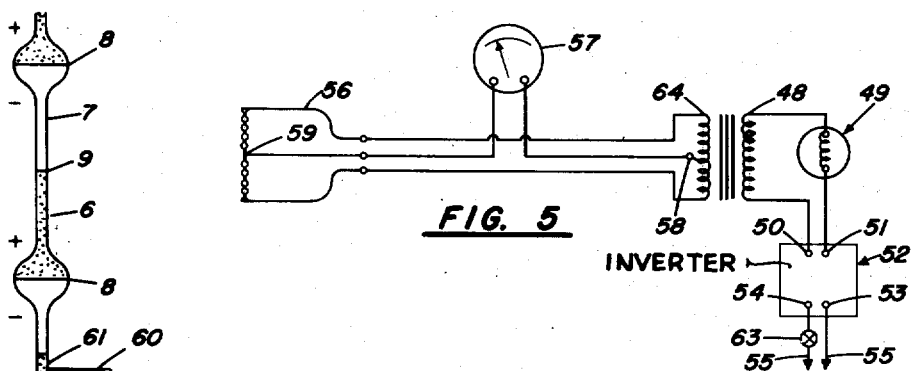
INVENTOR.
CHARLES E. HASTINGS
BY
ATTORNEYS Patented Sept. 22, 1953

2,652,723

UNITED STATES PATENT OFFICE 2,652,723

THERMAL AIR-SPEED INDICATOR

Charles E. Hastings, Hampton, Va.

Original application April 6, 1945, Serial No. 587,800. Divided and this application February 6, 1951, Serial No. 209,671

7 Claims. (Cl. 73—204)

(Granted under Title 35, U. S. Code (1952), sec. 266)

This invention relates to air speed indicators and recorders, and more particularly to the thermal responsive type.

This application is a division of my copending application for Thermal Air Speed Indicator, filed April 6, 1945, which issued February 6, 1951, as Patent No. 2,540,822.

Prior art devices for measuring low airspeeds are rendered expensive and complicated by reason of the very small pressures involved, and prior art devices for measuring high airspeeds are complicated and difficult to construct because of the necessary application of temperature and pressure corrections.

The apparatus embodying the instant invention overcomes the disadvantages of the prior art; the indicating or recording instrument of the subject device gives a direct measurement of change in resistance; errors due to changes in air temperature will be greatly reduced; radiation effects tend to cancel; and a greater stability of calibration is obtained.

One embodiment of the instant invention provides for the aforementioned improvements by employing a thermopile heated by an A.-C. source and having an indicating instrument responsive only to the D.-C. voltage generated by the thermopile. Hot and cold junctions of different cross-sections are employed. The cold junctions, of low electrical resistance, and of large cross-sectional area, will not be materially heated by the alternating current passing therethrough. The remaining interrelative junctions, the hot junctions, are made of small cross-sectional area resulting in a high electrical resistance whereby these junctions will be materially heated by the alternating current passing therethrough. By this means hot and cold thermojunctions are provided which generate an electromotive force; said force becomes a function of the air speed as the cooling effect of the air stream tends to equalize the thermojunction temperatures.

In another embodiment of the instant invention, no external A.-C. source is utilized for heating the thermojunctions, and a suitably calibrated indicator is provided which is responsive to the electromotive force resulting from adiabatic thermal differences produced at every other junction. As is known in the art, when a body is placed in a high velocity air stream, the air which comes to rest in front of the body is compressed and its temperature is raised depending only on the true velocity of the air. This temperature rise is 25 degrees centigrade at 500 miles per hour, and is independent of the air temperature or air density. Since the hot and cold junctions have different areas exposed to the air, the hot junctions have an adiabatic rise in temperature which is different from the adiabatic rise in temperature of the cold junctions. This difference in temperature resulting from the different adiabatic temperature rises produces a voltage which is utilized in measuring air speeds.

An object of this invention is to provide new and improved means for measuring low velocity air speeds by the utilization of an electromotive force generated by a pre-heated thermopile having hot and cold junctions of different cross-sections and subjected to the cooling effect of the air stream.

Another object of this invention is to provide new and improved apparatus for measuring high velocity air speeds by utilizing the difference in the adiabatic temperature rise at variously shaped junctions of a thermopile subjected to an air stream.

Other objects and advantages will become apparent after a consideration of the following description when taken in connection with the accompanying drawings in which:

Fig. 1 is a plan view of a pick-up device mounted in an air stream, for example, the air stream at the leading edge of an airplane wing;

Fig. 2 is a side-elevational view of the apparatus of Fig. 1;

Fig. 3 is another side-elevational view of the apparatus of Fig. 1;

Fig. 4 is a detailed view of a portion of the thermopile arrangement of Fig. 1;

Fig. 5 is a schematic electrical circuit diagram of an air speed meter utilizing the arrangement of Fig. 1; and Fig. 6 is a plan view of a modification of the apparatus of Fig. 5.

Particular reference is made now to Fig. 1 in which the airplane wing is generally designated by the numeral 28. A means for mounting the thermopile is designated by the reference numeral 56 and includes a center support 60 joined at 59 to the thermopile, shown in more detail in Fig. 4. The thermopile consists of alternate sections 6 and 7 of two dissimilar metals butt welded as at 8 and 9. Any number of sections can be used, depending on the thermo-electric potential desired, since the accumulated E. M. F. is proportional to the number of sections used. When one junction of the joined metals in an electrical circuit is heated, an E. M. F. is generated in said circuit. This bar-like arrangement produces a series of E. M. F.'s, the summation of which gives a total of E. M. F. Two dissimilar metals which give satisfactory results are constantan for section 7 and Chromel for section 6. However, it is well known that any other two dissimilar metals can be used with more or less effectiveness. It is noted that the thermopile has a central element 61 which is connected to the support 60 and has arms 62 extending therefrom to the support 56. The arms 62 are connected to the central element 61 in voltage opposition, i. e., the current generated by the upper thermopile arm flows from + to − towards the central element, while the current generated by the lower thermopile arm also flows from + to − towards the central element. In Fig. 4 the cold junctions are designated by the reference numeral 8, and the hot junctions are designated by the numeral 9. It is noted that the cold junctions have considerably greater cross-sectional area than the hot junctions. The cold junctions 8 are made with enlarged cross sectional areas so that they will have low resistance, thereby resulting in unappreciable heating when alternating current is passed therethrough. The hot junctions 9 are made of small cross sectional areas so that they will have a high resistance, thereby resulting in a considerable amount of heating when alternating current is passed therethrough.

Particular reference is made now to Fig. 5. The lead connections 55 are connected by way of switch 63 to a suitable D.-C. source, not shown, and are connected at terminals 54 and 53 to a suitable A.-C. inverter generally designated 52, which may conveniently generate alternating current of 800 cycles per second, and which has its output applied from terminals 50 and 51 by way of the current regulating ballast tube 49 to a transformer having a primary 48, the secondary of the transformer designated 64 being center tapped at 58, one end terminal of secondary 64 being connected to one end of the thermo device, the other terminal of the secondary being connected to the other end of the thermo device, the indicating device 57 being connected to the junction 59 and the center tap 58.

In the operation of the above described apparatus of Fig. 5, since the meter 57 is connected between the center tap 58 of the secondary winding and the center tap 59 of the thermopile, the center taps 58 and 59 are points of equipotential and no alternating current will flow through the meter 57. It will be noted, from the observation of Fig. 4, that the voltage generated by the sections of the thermopile 62, at each side of the center portion 61, will be in polarity opposition and therefore, direct current will flow toward the center tap 59 and through the meter 57. Since the voltage output of thermopile is proportional to air speed, the meter 57 may be readily calibrated to give a direct reading thereof.

Particular reference is made now to Fig. 6 in which is shown an additional bridge arrangement somewhat modifying the bridge arrangement of Fig. 3. In the bridge of Fig. 6, alternating current may be supplied to the bridge from a suitable source, not shown, and the indicating instrument connected to the bridge and responsive to the D.-C. voltage generated in the bridge, and may be calibrated in air velocity.

The bridge includes arms generally designated 66, 67, 68, and 69, having input junction members 81 and 82 at which the A.-C. is applied by way of supports or other members 73 and 71 respectively connected to leads 77 and 76 respectively, and having output junction members 83 and 80 connected to supports or other members 70 and 72 respectively, and thence by way of leads 75 and 78 to meter 57'. The members 70, 71, 72, and 73 may be suitably mounted in support post 74 to maintain the bridge in an airstream.

Various modifications of the aforedescribed invention may be made; it is to be understood that within the scope of the appended claims, the invention may be practiced otherwise than as specifically described.

The invention described herein may be manufactured and used by or for the Government of the United States of America for governmental purposes without the payment of any royalties thereon or therefor.

What is claimed as new and desired to be secured by Letters Patent of the United States is:

1. An air speed indicator comprising first and second thermopile bars joined at a common junction and connected in D.-C. polarity opposition, each of said bars having cold junctions of substantially greater cross-sectional area than the associated hot junctions, bridge means including said first and second thermopile bars in two arms thereof, a transformer having a center-tapped secondary, said bridge means including said secondary as the other two arms thereof, means for supporting both thermopile bars in the air stream, a D. C. indicating device calibrated in air speed connected between the center tap and the junction of said thermopile bars, and means operatively connected to the primary of said transformer for applying an alternating current thereto for heating said thermopile bars.

2. An air speed indicator comprising, in combination, thermopile means including a two leg thermopile, each of said legs having cold junctions of substantially greater cross-sectional area than the associated hot junctions, means for supporting said thermopile in the air stream, A.-C. electrical means including a center-tapped transformer secondary having the two secondary terminals connected to said two legs respectively, said two legs being series connected, said A.-C. means normally heating said hot and cold junctions to different temperatures in accordance with their respective cross-sections and causing each of said legs to generate a D.-C. voltage proportional to the temperature difference, said legs being similar and connected in D.-C. polarity opposition, the air in the airstream acting to bring the temperature difference and D.-C. voltage to an amount corresponding to the speed of the air, and indicating means operatively connected between said center tap and the junction between said legs, said indicating means being responsive only to said D.-C. and calibrated to give a measure of air speed.

3. An airspeed indicator, comprising: a source of alternating current; a thermopile having the cold junctions of substantially greater cross-sectional area than the associated hot junctions so that the difference of $I^2R$ through said junctions generate an E. M. F. of measurable magnitude where $I^2$ denotes current squared and R, electrical resistance, the polarity of said thermopile being reversed on opposite sides of its center; means for supporting the thermopile in the airstream; a transformer having its primary coil connected across the output terminals of said source of current and its secondary coil connected across said thermopile; indicating means center-tapped across said secondary coil and said thermopile; and a ballast tube in series with said primary coil.

4. An airspeed indicator, comprising: a source of alternating current; a thermopile having the cold junctions of substantially greater cross-sectional area than the associated hot junctions so that the difference of $I^2R$ through said junctions generates an E. M. F. of measurable magnitude where $I^2$ denotes current squared and $R$, electrical resistance, the polarity of said thermopile being reversed on opposite sides of its center; means for supporting the thermopile in the airstream; inductive coupling means coupling said source of current and said thermopile; a constant current means in series with said coupling means and said source; and indicating means center-tapped across said coupling means and said thermopile.

5. In an airspeed indicator, comprising: a source of alternating current; a thermopile having its cold junctions of substantially greater cross-sectional area than the associated hot junctions, adapted to generate a thermal difference E. M. F., the polarity of said thermopile being reversed on opposite sides of its center; means for mounting the thermopile in the airstream; inductive coupling means coupling said source of current and said thermopile; and deflecting means responsive to said E. M. F. center-tapped across said inductive coupling means and said thermopile.

6. In an airspeed indicator, comprising: a source of alternating current; thermocouple means having its cold junction means of substantially greater cross-sectional area than the associated hot junction means, adapted to generate a thermal difference of E. M. F., the polarity of said thermocouple means being reversed on opposite sides of its center; means for mounting the thermocouple means in the airstream; inductive coupling means coupling said source of current and said thermocouple means; and means responsive to said E. M. F. center-tapped across said inductive coupling means and said thermocouple means.

7. In an airspeed indicator, comprising: a source of alternating current; thermocouple means having its cold junction means of substantially greater cross-sectional area than the associated hot junction means, the polarity of said thermocouple means being reversed on opposite sides of its center; means for mounting said thermocouple means in the airstream; inductive coupling means coupling said source of current and said thermocouple means; and indicating means center-tapped across said inductive coupling means and said thermocouple means, said indicating means being calibrated in airspeed.

CHARLES E. HASTINGS.

References Cited in the file of this patent

UNITED STATES PATENTS

| Number | Name | Date |
|---|---|---|
| 1,264,423 | Moore | Apr. 30, 1918 |
| 2,193,516 | Laing | Mar. 12, 1940 |
| 2,540,822 | Hastings | Feb. 6, 1951 |

FOREIGN PATENTS

| Number | Country | Date |
|---|---|---|
| 888,695 | France | Sept. 13, 1943 |